United States Patent [19]
Parker

[11] 3,830,464
[45] Aug. 20, 1974

[54] TAPS AND VALVES
[75] Inventor: Robert W. Parker, Maidstone, England
[73] Assignee: Reed International Limited, London, England
[22] Filed: June 21, 1972
[21] Appl. No.: 265,040

[52] U.S. Cl. ............................ 251/269, 251/214
[51] Int. Cl. ........................................ F16k 31/44
[58] Field of Search ........... 251/266, 267, 268, 269, 251/270, 214

[56] References Cited
UNITED STATES PATENTS

| | | | |
|---|---|---|---|
| 682,688 | 9/1901 | Hart | 251/267 X |
| 1,425,708 | 8/1922 | Springborn | 251/268 |
| 1,477,154 | 12/1923 | Springborn | 251/269 X |
| 2,903,006 | 9/1959 | Seaver | 251/267 X |

Primary Examiner—William R. Cline
Assistant Examiner—David R. Matthews
Attorney, Agent, or Firm—Pollock, Philpitt & Vande Sande

[57] ABSTRACT

A tap or valve having a valve housing in which is disposed a valve assembly comprising a longitudinally movable operating spindle carrying a valve member, a rotatable operating sleeve threadedly engaging the spindle and a closure sleeve threadedly engaging the valve housing to trap the operating sleeve in the housing, the spindle, the operating sleeve and the closure sleeve being concentrically disposed over part of their lengths within the valve housing.

4 Claims, 1 Drawing Figure

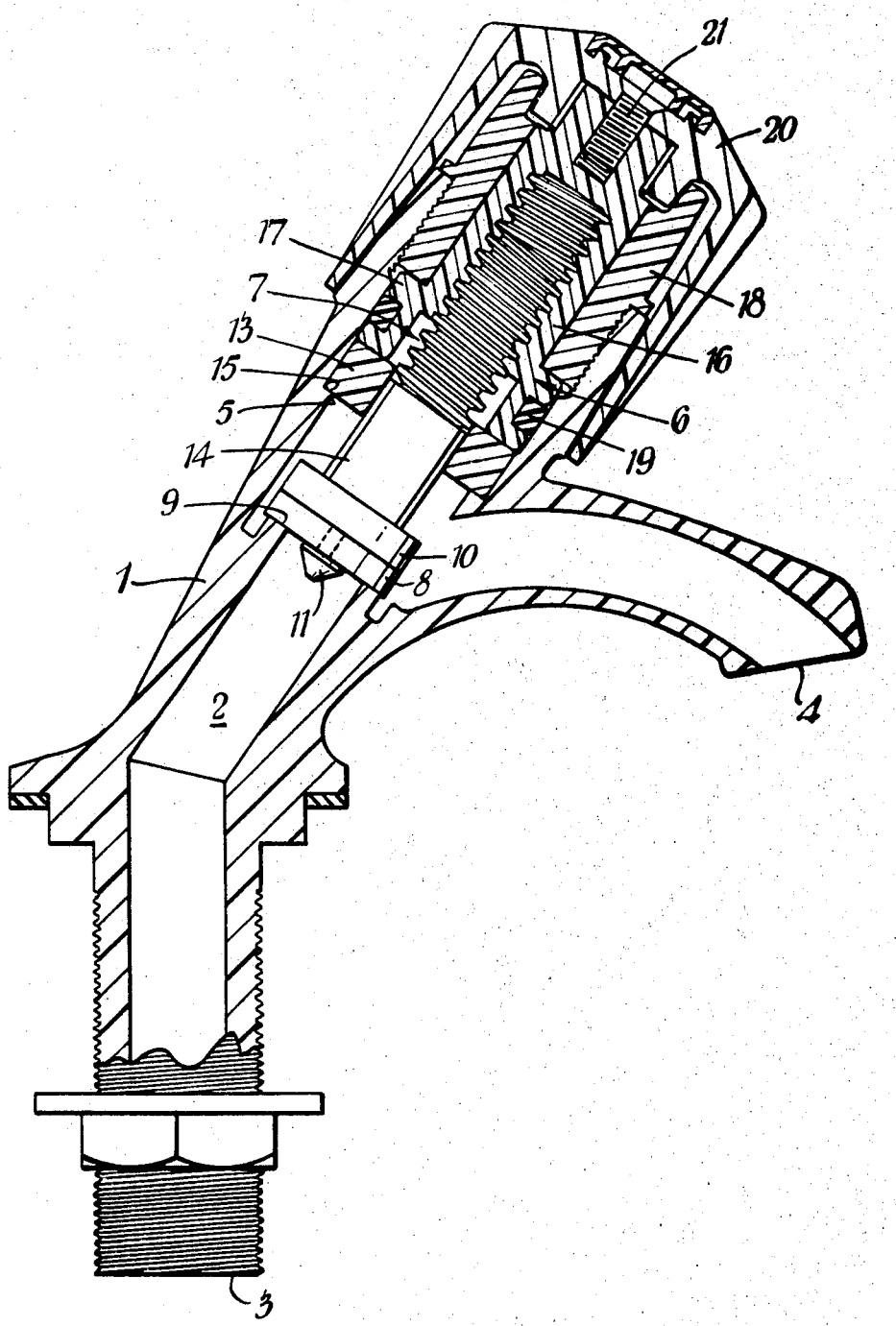

TAPS AND VALVES

This invention relates to taps and valves which are adjustable to control the flow of fluid under pressure along a fluid conduit. More particularly, but not exclusively, this invention relates to domestic type water taps made of plastic material.

According to this invention a tap or valve comprises, a body having a passage through it for fluid and a valve housing opening into the passage, a valve assembly disposed in the valve housing and operable to adjust the flow of fluid along the passage, the valve assembly comprising a spindle restrained against rotation in the housing and carrying a valve member for obstructing the passage, a rotatable operating sleeve restrained against axial movement in the valve housing and threadedly engaging the spindle so that upon rotation it causes axial movement of the spindle to adjust the position of the valve member relatively to the passage, and a closure sleeve threadedly engaging the body to trap the operating sleeve in the valve housing, the spindle, the operating sleeve and the closure sleeve being concentrically disposed over part of their lengths within the valve housing.

By reason of the concentric disposition of the operating sleeve, the closure sleeve and the body, the aggregate mechanical strength of all these components contributes to the resistance to bursting stresses imposed by fluid pressure and operating torques and this is particularly advantageous when these components are made of plastic material.

By using an operating sleeve which is closed at its outer end, that is at its end remote from the passage for fluid, the valve housing may be sealed against fluid flow past it by a single sealing ring locating around the operating sleeve and engaging the wall of the valve housing.

An operating knob or handle may be splined or keyed on to the rotatable operating sleeve and be secured thereto by a lock-screw in the form of a grub or cheese-headed screw which screws into the top of the operating sleeve.

One construction of a domestic type water tap in accordance with the invention will now be described by way of example with reference to the accompanying drawing which shows a sectional elevation of the tap.

The tap has a body 1 with a water passage 2 leading from inlet 3 to outlet 4. The body 1 also has an open-ended generally cylindrical valve housing 5 opening at its inner end into the passage 2. The valve housing 5 contains a valve assembly 6.

The valve assembly 6 has a spindle 7 which at its inner end carries a valve member 8 in the form of a washer for engaging a valve seat 9 in the passage 2. The washer 8 is backed by a flange 10 on the spindle 7 and is retained on the spindle 7 by the head 11 of a stud projecting from the end of the spindle 7. Alternatively the washer 8 may be contained by a lip around the flange 10 the lip having an inturned free edge which engages over the outer face of the washer 8. The spindle 7 is restrained from rotating in the housing 5 by a guide collar 13 which has a square aperture through which the square sectioned length 14 of the spindle 7 is axially slidable. The collar 13 is fitted into the housing by sliding it axially along the housing 5 until it abuts shoulder 15. The outer periphery of the collar 13 is provided with flats which locate against correspondingly formed flats on the wall of the housing 5 and so is prevented from rotating. Alternatively the spindle 7 may be retained against rotation by guides moulded into the body 1 with consequent elimination of the collar 13. Thus, for example, the guides, such as flats, may cooperate with the peripheral surface of the flange 10 shaped accordingly.

The spindle 7 above the square sectioned length 14 is threaded and is engaged by a rotatable operating sleeve 16. At its inner end the operating sleeve 16 is stepped outwardly to provide flange 17 whose outer periphery lies closely against the wall of the housing 5. One face of the flange abuts collar 13 and its other face is engaged by the inner end of a closure sleeve 18 which threadedly engages in the outer end of the housing 5. Thus the operating sleeve 16 is trapped in the housing 5 and is prevented from axial movement.

The outer end of the operating sleeve 16 is closed to form, so to speak, a cap over the outer end of the spindle 7 and a sealing ring 19 locating in a peripheral groove of the flange 17 sealingly engages the wall of housing 5. By this arrangement a single ring can be used to seal the housing 5 against the flow of water past it.

An operating knob 20 is secured by screw 21 to the outer end of the operating sleeve 16. Rotation of the knob 20 will cause rotation of the sleeve 16 and hence axial movement of the spindle 7 to cause adjustment of the washer 8 relatively to the valve seating 9.

As previously stated the concentric arrangement of the operating sleeve, the closure sleeve and the tap body increases the resistance of the tap to bursting stresses imposed by the water pressure. Also since the concentricity extends over the threaded portions of these members it prevents expansion of the members by the threads tending to over-ride due to their weding inter-action. By the use of the separately formed collar for preventing rotation of the spindle the valve assembly can be readily dismantled for example in order to replace the washer.

I claim:

1. A tap or valve comprising a body having a passage through it for fluid, a valve housing opening into the passage, and a valve assembly disposed in the valve housing and operable to adjust the flow of fluid along the passage, the valve assembly comprising a spindle restrained against rotation in the housing and a valve member carried by the spindle for obstructing the passage, a rotatable operating sleeve restrained against axial movement in the valve housing and threadably engaging the spindle so that upon rotation it causes axial movement of the spindle to adjust the position of the valve member relative to the passage, and a closure sleeve threadably engaging the body to trap the operating sleeve in the valve housing, the rotatable operating sleeve being closed at its outer end and extending completely through the closure sleeve and being stepped radially outwardly at its inner end to provide a flange, a single sealing means consisting of a sealing ring mounted on the periphery of the flange and sealingly engaging the internal wall surface of the valve housing.

2. A tap or valve as claimed in claim 1, wherein the spindle in the region of its inner end extends through guide means which prevent rotation of the spindle relative to the valve housing.

3. A tap or valve as claimed in claim 2, wherein the guide means comprises a removable collar non-rotatably located within the valve housing and having an aperture through which the operating spindle passes the aperture and the portion of the spindle passing through it being shaped to prevent rotation of the spindle.

4. A tap or valve as claimed in claim 3, wherein the collar abuts against an internal shoulder in the valve housing and provides an abutment for the operating sleeve so that the operating sleeve is trapped against axial movement between the closure sleeve and the collar.

* * * * *

U-1050
5/69)

UNITED STATES PATENT OFFICE
CERTIFICATE OF CORRECTION

Patent No. 3,830,464            Dated August 20, 1974

Inventor(s) ROBERT W. PARKER

It is certified that error appears in the above-identified patent and that said Letters Patent are hereby corrected as shown below:

Foreign Application Priority Data

July 8, 1971   Great Britain. . . . . . . . .32134/71

Signed and sealed this 17th day of December 1974.

(SEAL)
Attest:

McCOY M. GIBSON JR.
Attesting Officer

C. MARSHALL DANN
Commissioner of Patents